United States Patent
Sandler et al.

(10) Patent No.: US 9,626,550 B2
(45) Date of Patent: Apr. 18, 2017

(54) GROUPING FACE IMAGES USING STATISTIC DISTRIBUTION ESTIMATE

(71) Applicant: Shutterfly, Inc., Redwood City, CA (US)

(72) Inventors: Roman Sandler, Haifa (IL); Alexander M. Kenis, Kiryat Motzkin (IL)

(73) Assignee: Shutterfly, Inc., Redwood City, CA (US)

( * ) Notice: Subject to any disclaimer, the term of this patent is extended or adjusted under 35 U.S.C. 154(b) by 0 days.

(21) Appl. No.: 15/050,189

(22) Filed: Feb. 22, 2016

(65) Prior Publication Data

US 2016/0171284 A1    Jun. 16, 2016

Related U.S. Application Data

(63) Continuation of application No. 14/272,809, filed on May 8, 2014, now Pat. No. 9,280,701.

(51) Int. Cl.
| | |
|---|---|
| *G06K 9/00* | (2006.01) |
| *G06K 9/52* | (2006.01) |
| *G06K 9/62* | (2006.01) |
| *G06K 9/66* | (2006.01) |

(52) U.S. Cl.
CPC ..... *G06K 9/00228* (2013.01); *G06K 9/00288* (2013.01); *G06K 9/52* (2013.01); *G06K 9/6215* (2013.01); *G06K 9/6221* (2013.01); *G06K 9/6267* (2013.01); *G06K 9/66* (2013.01)

(58) Field of Classification Search
None
See application file for complete search history.

(56) References Cited

U.S. PATENT DOCUMENTS

| | | | | |
|---|---|---|---|---|
| 7,319,779 | B1* | 1/2008 | Mummareddy | G06K 9/00288 382/118 |
| 7,505,621 | B1* | 3/2009 | Agrawal | G06K 9/00288 382/118 |
| 8,503,739 | B2* | 8/2013 | Bourdev | G06K 9/00281 382/118 |
| 2011/0038512 | A1* | 2/2011 | Petrou | G06F 17/30256 382/118 |

(Continued)

FOREIGN PATENT DOCUMENTS

CN        102592148 A   *   7/2012

*Primary Examiner* — Jayesh A Patel
(74) *Attorney, Agent, or Firm* — Xin Wen

(57) ABSTRACT

A computer-implemented method for sorting face images of different individuals into different groups includes obtaining face images comprising faces of unknown individuals by a computer processor; calculating similarity functions between pairs of face images by the computer processor; joining face images that have values of the similarity functions above a predetermined threshold into a hypothetical face group, wherein the face images in the hypothetical face group hypothetically belong to a same person; conducting non-negative matrix factorization on values of the similarity functions in the hypothetical face group to test truthfulness of the hypothetical face group; and identifying the hypothetical face group as a true face group if a percentage of the associated similarity functions being true is above a threshold based on the non-negative matrix factorization.

6 Claims, 3 Drawing Sheets

(56) References Cited

U.S. PATENT DOCUMENTS

2011/0064302 A1* 3/2011 Ma .................... G06K 9/00275
382/159
2011/0211736 A1* 9/2011 Krupka ............. G06F 17/30259
382/118

* cited by examiner

GROUPING FACE IMAGES USING STATISTIC DISTRIBUTION ESTIMATE

CROSS-REFERENCE TO RELATED APPLICATIONS

The present application is a continuation application of and claims priority to commonly assigned pending U.S. patent application Ser. No. 14/272,809, titled "Grouping face images using statistic distribution estate", filed by the same inventors on May 8, 2014, the disclosures of which is incorporated herein by reference.

TECHNICAL FIELD

This application relates to digital imaging technologies, and more specifically, to identifying, analyzing, and grouping faces that appear in digital images.

BACKGROUND OF THE INVENTION

The problem of face detection has received a great deal of attention. Most conventional techniques concentrate on face recognition, assuming that a region of an image containing a single face has already been detected and extracted and will be provided as an input. Common face detection methods include: knowledge-based methods; feature-invariant approaches, including the identification of facial features, texture and skin color; template matching methods, both fixed and deformable; and appearance based methods.

After faces are detected, there is a need to categorize the detected face images of each individual into a group regardless whether the identity of the individual is known or not. For example, if two individuals Person A and Person B are detected in ten images. Each of the images can be categorized or tagged one of the four types: A only; B only; A and B; or neither A nor B. Algorithmically, the tagging of face images require training based one face images or face models or known persons, for example, the face images of family members or friends of a user who uploaded the images.

There is still a need for more convenient and more accurate methods to separately tag or categorize face images of different persons.

SUMMARY OF THE INVENTION

The present application discloses computer implemented methods that automatically categorize face images that belong to different persons. The methods are based on the statistics of the face images to be categorized, and do not require prior retraining with known people' faces or supervision during the grouping of face images. Acceptance criteria in the methods are based on probabilistic description and can be adjusted.

Moreover, the disclosed methods are applicable to different similarity functions, and are compatible with different types of face analyses and face descriptors.

In a general aspect, the present invention relates to a computer-implemented method for sorting face images of different individuals into different groups. The method includes obtaining face images comprising faces of unknown individuals by a computer processor; calculating similarity functions between pairs of face images by the computer processor; joining face images that have values of the similarity functions above a predetermined threshold into a hypothetical face group, wherein the face images in the hypothetical face group hypothetically belong to a same person; conducting non-negative matrix factorization on values of the similarity functions in the hypothetical face group to test truthfulness of the hypothetical face group; and identifying the hypothetical face group as a true face group if a percentage of the associated similarity functions being true is above a threshold based on the non-negative matrix factorization.

Implementations of the system may include one or more of the following. The computer-implemented method can further include rejecting the hypothetical face group as a true face group if a percentage of the associated similarity functions being true is below a threshold. The step of conducting non-negative matrix factorization can include forming a non-negative matrix using values of similarity functions between all different pairs of face images in the hypothetical face group, wherein the non-negative matrix factorization is conducted over the non-negative matrix. The similarity functions in the hypothetical face group are described in a similarity distribution function, wherein the step of non-negative matrix factorization outputs a True similarity distribution function and a False similarity distribution function. The step of identifying can include: comparing the similarity distribution function to the True similarity distribution function and the False similarity distribution function. Every pair of face images in the hypothetical face group has a similarity function above the predetermined threshold. The computer-implemented method can further include: joining two true face groups to form a joint face group; conducting non-negative matrix factorization on values of similarity functions in the joint face group; and merging the two true face groups if a percentage of the associated similarity functions being true is above a threshold in the joint face group. The similarity functions in the joint face group can be described in a similarity distribution function, wherein the step of conducting non-negative matrix factorization on values of similarity functions in the joint face group outputs a True similarity distribution function and a False similarity distribution function. The step of identifying comprises: comparing the similarity distribution function to the True similarity distribution function and the False similarity distribution function. The computer-implemented method can further include detecting the faces in images; and cropping portions of the images to produce the face images comprising faces of the unknown individuals.

In another general aspect, the present invention relates to a computer-implemented method for recognizing face images. The method includes storing face models or face images of a known person as training faces in a computer storage; joining a group of testing face images with a group of training faces that belong to the known person to form a joint face group; calculating similarity functions, by a computer processor, between pairs of testing face images or training faces in the joint group; conducting non-negative matrix factorization on values of the similarity functions in the joint face group to test truthfulness of the joint face group; and identifying the testing face images to belong to the known persons if a percentage of the associated similarity functions being true is above a threshold based on the non-negative matrix factorization.

Implementations of the system may include one or more of the following. The computer-implemented method can further include merging the testing face images with the training faces of the known person to form a new set of training faces for the known person. The step of conducting non-negative matrix factorization can include forming a non-negative matrix using values of similarity functions between all different pairs of testing face images and training faces in the joint face group, wherein the non-negative matrix factorization is conducted over the non-negative matrix. The similarity functions in the joint face group can be described in a similarity distribution function, wherein the step of non-negative matrix factorization outputs a True similarity distribution function and a False similarity distribution function. The step of identifying can include comparing the similarity distribution function to the True similarity distribution function and the False similarity distribution function.

These and other aspects, their implementations and other features are described in detail in the drawings, the description and the claims.

DETAILED DESCRIPTION OF THE INVENTION

Figure 1:
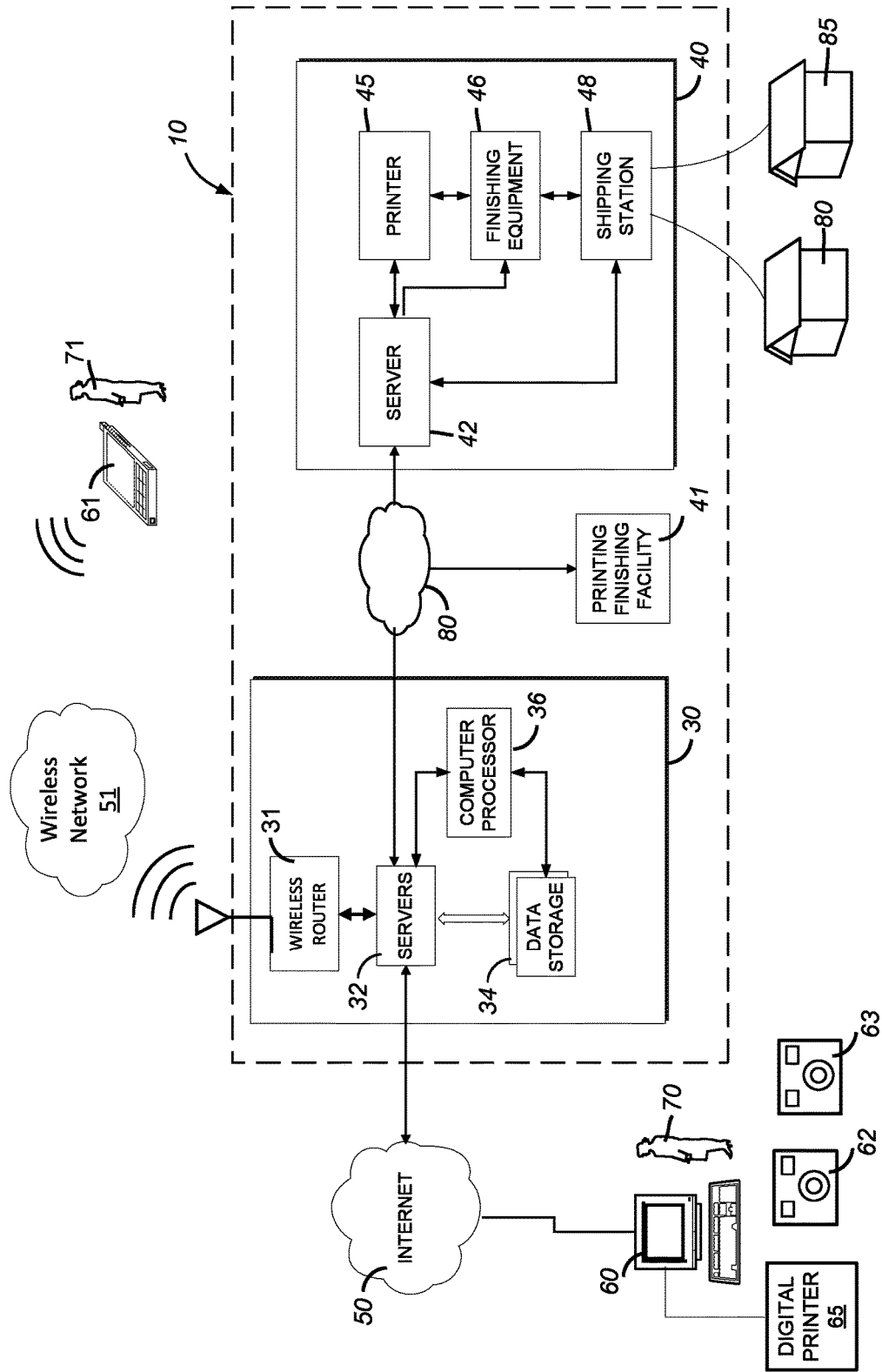
FIG. 1 is a block diagram for a network-based system for producing personalized image products, image designs, or image projects compatible with the present invention.

Referring to FIG. 1, a network-based imaging service system 10 can enable users 70, 71 to organize and share images via a wired network or a wireless network 51. The network-based imaging service system 10 is operated by an image service provider such as Shutterfly, Inc. Optionally, the network-based imaging service system 10 can also fulfill image products ordered by the users 70, 71. The network-based imaging service system 10 includes a data center 30, one or more product fulfillment centers 40, 41, and a computer network 80 that facilitates the communications between the data center 30 and the product fulfillment centers 40, 41.

The data center 30 includes one or more servers 32 for communicating with the users 70, 71, a data storage 34 for storing user data, image and design data, and product information, and computer processor(s) 36 for rendering images and product designs, organizing images, and processing orders. The user data can include account information, discount information, and order information associated with the user. A website can be powered by the servers 32 and can be accessed by the user 70 using a computer device 60 via the Internet 50, or by the user 71 using a wireless device 61 via the wireless network 51. The servers 32 can also support a mobile application to be downloaded onto wireless devices 61.

The network-based imaging service system 10 can provide products that require user participations in designs and personalization. Examples of these products include the personalized image products that incorporate photos provided by the users, the image service provider, or other sources. In the present disclosure, the term "personalized" refers to information that is specific to the recipient, the user, the gift product, and the occasion, which can include personalized content, personalized text messages, personalized images, and personalized designs that can be incorporated in the image products. The content of personalization can be provided by a user or selected by the user from a library of content provided by the service provider. The term "personalized information" can also be referred to as "individualized information" or "customized information".

Personalized image products can include users' photos, personalized text, personalized designs, and content licensed from a third party. Examples of personalized image products may include photobooks, personalized greeting cards, photo stationeries, photo or image prints, photo posters, photo banners, photo playing cards, photo T-shirts, photo mugs, photo aprons, photo magnets, photo mouse pads, a photo phone case, a case for a tablet computer, photo key-chains, photo collectors, photo coasters, photo banners, or other types of photo gift or novelty item. The term photobook generally refers to as bound multi-page product that includes at least one image on a book page. Photobooks can include photo albums, scrapbooks, bound photo calendars, or photo snap books, etc. An image product can include a single page or multiple pages. Each page can include one or more images, text, and design elements. Some of the images may be laid out in an image collage.

The user 70 or his/her family may own multiple cameras 62, 63. The user 70 transfers images from cameras 62, 63 to the computer device 60. The user 70 can edit, organize images from the cameras 62, 63 on the computer device 60. The computer device 60 can be in many different forms: a personal computer, a laptop, or tablet computer, a mobile phone etc. The camera 62 can include an image capture device integrated in or connected with in the computer device 60. For example, laptop computers or computer monitors can include built-in camera for picture taking. The user 70 can also print pictures using a printer 65 and make image products based on the images from the cameras 62, 63. Examples for the cameras 62, 63 include a digital camera, a camera phone, a video camera capable of taking motion and still images, a laptop computer, or a tablet computer.

Images in the cameras 62, 63 can be uploaded to the server 32 to allow the user 70 to organize and render images at the website, share the images with others, and design or order image product using the images from the cameras 62, 63. The wireless device 61 can include a mobile phone, a tablet computer, or a laptop computer, etc. The wireless device 61 can include a built-in camera (e.g. in the case of a camera phone). The pictures taken by the user 71 using the wireless device 61 can be uploaded to the data center 30. If users 70, 71 are members of a family or associated in a group (e.g. a soccer team), the images from the cameras 62, 63 and the mobile device 61 can be grouped together to be incorporated into an image product such as a photobook, or used in a blog page for an event such as a soccer game.

The users 70, 71 can order a physical product based on the design of the image product, which can be manufactured by the printing and finishing facilities 40 and 41. A recipient receives the physical product with messages from the users at locations 80, 85. The recipient can also receive a digital version of the design of the image product over the Internet 50 and/or a wireless network 51. For example, the recipient can receive, on her mobile phone, an electronic version of the greeting card signed by handwritten signatures from her family members.

The creation of personalized image products, however, can take considerable amount of time and effort. In some occasions, several people may want to contribute to a common image product. For example, a group of people may want or need to jointly sign their names, and write comments on a get-well card, a baby-shower card, a wedding-gift card. The group of people may be at different locations. In particular, it will be desirable to enable the group of people to quickly write their names and messages in the common image product using mobile devices.

The images stored in the data storage 34, the computer device 60, or the mobile device 61 can be associated with metadata that characterize the images. Examples of such data include image size or resolutions, image colors, image capture time and locations, image exposure conditions, image editing parameters, image borders, etc. The metadata can also include user input parameters such as the occasions for which the images were taken, favorite rating of the photo, keyword, and the folder or the group to which the images are assigned, etc. For many image applications, especially for creating personalized image products or digital photo stories, it is beneficial to recognize and identify people's faces in the images stored in the data storage 34, the computer device 60, or the mobile device 61. For example, when a family photobook is to be created, it would very helpful to be able to automatically find photos that include members within that family.

Figure 2:
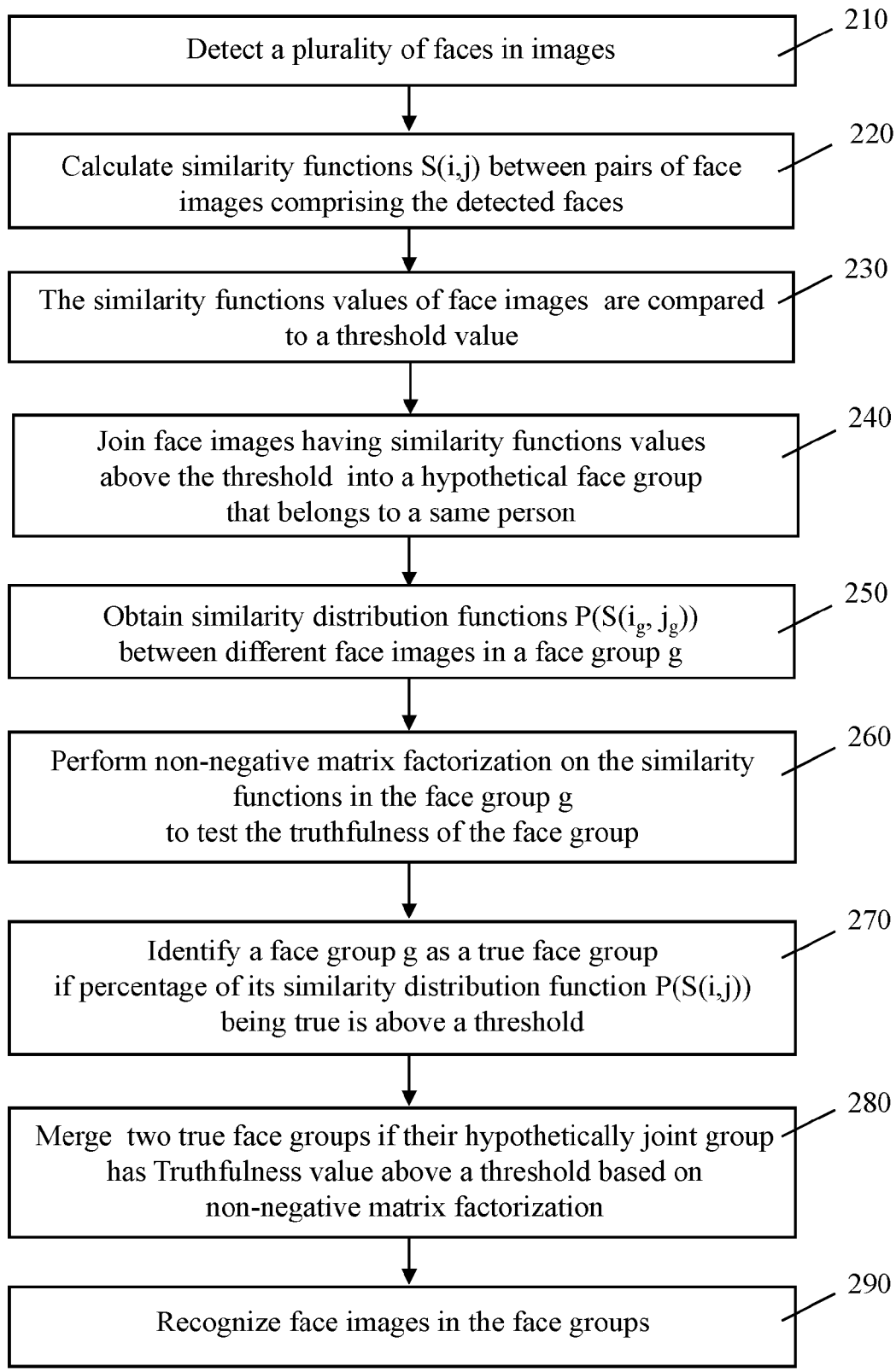
FIG. 2 is a flow diagram for categorizing face images that belong to different persons in accordance with the present invention.

Referring to FIGS. 1 and 2, faces can be detected in the digital images by the computer processor 36, the computer device 60, or the mobile device 61 (step 210). The portions of the images that contain the detected faces are cropped out to produce face images, each of which usually includes a single face.

The method then calculates similarity function $S(i,j)$ for each pair of face images i and j among the detected faces (step 220). The disclosed method is generally not restricted to the specific design of similarity function $S(i,j)$. For example, the similar function can be based on inner products of feature vectors from two face image. In another example, two face images can be compared to an etalon set of faces. Similar faces will be similar to the same third party faces and dissimilar with the others. Eigen-space best describing all album faces is calculated. The similarity between the two face images is the exponent of minus distance between the two face vectors in this space.

For ease of computation, the similarity function can be scaled to a numeric range between −1 and 1, that is, $-1 \leq S(i,i) \leq 1$. For two identical face images i, $S(i,i)=1$. In general, the average similarity value between face images of a same person is larger than the average similarity function value between face images of different people.

The similarity value between a pair of face images is related to the probability that the two face images belonging to a same person, but it does not tell which face images together belong to a hypothetical person (identifiable or not). The present method disclosure statistically assesses the probability that a group of face images are indeed faces of the same person. In some embodiments, the values of similarity functions for different pairs of face images are compared to a threshold value T (step 230). The face images that are connected through a chain of similarity values higher than T are joined into a hypothetical face group g that potentially belongs to a single person (step 240).

This process is generally known as greedy join. In principle, if ground truth is known, the hypotheses created this way can be assessed using the basic analysis and the overall precision and recall associated with T can be estimated. Since the ground truth in not known, the quality of the hypothesis will be estimated in a different way, as described below. Moreover, by repeating greedy join for different thresholds we can find T associated with the best estimate. Applying greedy join for this threshold results in good face groups.

Once the groups {g} are constructed by greedy join for random values of T, a similarity distribution function $\{P(S(i_g, j_g))\}$ between different pairs of face images in each face group g is obtained (step 250). Face images in each face group g are characterized by a similar distribution function $P(S(i,j))$, which is the probability distribution of similarity function values for all different pairs of face images in the face group g. The similarity distribution function $\{P(S(i_g, j_g))\}$ has a plurality of similarity function values $S(i_g, j_g)$ for different pair of face images i, j.

In some aspects, the use of the similar distribution function $P(S(i,j))$ to describe a group of face images in the disclosed method is based on several empiric observations: In a given small (<100) set of face images, the similarities inside true face groups (face images of the same person) have the same similarity distribution $P_{true}(S)$, where both i and j are faces in the same face group. The similarities between faces of different persons are distributed with similarity distribution $P_{false}(S)$ For larger face sets, several $P_{true}(S)$ distributions are established. Thus, when $P_{true}$ and $P_{false}$ are known, we can assess how many of the face pairs in a group of face images are of the same persons by solving a linear regression.

Next, non-negative matrix factorization is performed on the similarity distribution function $\{P(S(i_g,j_g))\}$ to estimate $\{P_{true}, P_{false}\}$ and test the truthfulness of the face groups {g} (step 260). The similarity distribution function $\{P(S(i_g,j_g))\}$ has non-negative values for different $S(i_g,j_g)$'s. Organized in vectors they form a non-negative matrix. Non-negative matrix factorization (NMF) is a group of algorithms in multivariate analysis and linear algebra where a matrix V is factorized into two or more non-negative matrices. This non-negativity makes the resulting matrices easier to analyze. NMF in general is not exactly solvable; it is commonly approximated numerically. Specifically, the resulting factor matrices are initialized with random values, or using some problem-tied heuristic. Then, all-but-one of the factors are fixed, and the remaining matrix values are solved, e.g., by regression. This process is continued for each factor matrix. The iterations continue until conversion.

An output of NMF is a matrix having columns $P_{true}$ and $P_{false}$. Another result of NMF is a matrix for determining similarities of the hypothesized face groups to $P_{true}$ and $P_{false}$ distributions. Face groups that are similar to the "true" distribution are accepted as good face groups. Other face groups are ignored. It should be noted that $P_{true}$ and $P_{false}$ distributions can be different for each group of face images. Thus the NMF needs to be performed for every group of user images of interest, such as each user album.

In one general aspect, rather than characterizing each face separately, the presently disclosed method characterizes a face image by a distribution of its similarities to all other face images in the same face group. Thus, when P_true(S) and P_false(S) are known, $P(S(i,j))$ can be tested to see how close it is to P_true and P_false by solving linear equation. Furthermore, the obtained weights (i.e. precision in data analysis) specify how many pairs in $P(S(i,j))$ belong to P_true(S) and the rest part of $P(S(i,j))$ belongs to P_false(S). A face group g is identified as a true face group if percentage of its similarity distribution function $P(S(i,j))$ being true is above a threshold (step 270). A face group is rejected if it has $P(S(i,j))$ values that have "truthfulness" less than a predetermined percentage value.

In an often occurring example, a wrong face is highly similar to a single face in a face group, but is dissimilar to all face images in the same face group. In this case, $P(S(i,j))$ similar to P_false, and the merge between the wrong face and the face group is rejected. In another example, a face has relatively low similarity to all face images in a group, but P(S(i,j)) can still be more similar to P_true and the merge is be accepted. The main benefit of the presently disclosed approach is that it does not define rules on similarities or dissimilarities between a pair of individual faces. The determination if a face image belongs to a face group is statistical and based on the collective similarity properties a whole of face images.

After accepting some of the initial groups, there can still be true face groups and single faces that need to be joined. For every group pair $(g_1, g_2)$, a joint hypothesis group $h_{12}$ is considered ($g_i$ can be a single face). $P_{true}(S)$ and $P_{false}(S)$ are calculated using NMF as described above to test if face pair similarities of $h_{ij}$ has high precision (i.e. similarity functions in the joint face group are true above a predetermined threshold) and, thus, groups $g_i$ and $g_j$ should be merged (step 280). Accurate hypotheses are accepted and the overall recall rises. This enhancement method allows merging faces that associated by relatively low similarity between them, without merging all faces associated with this similarity, as done by the greedy join method.

Optionally, the hypothetical persons corresponding to the face groups are recognized using known persons' face images or face models (step 290).

Figure 3:
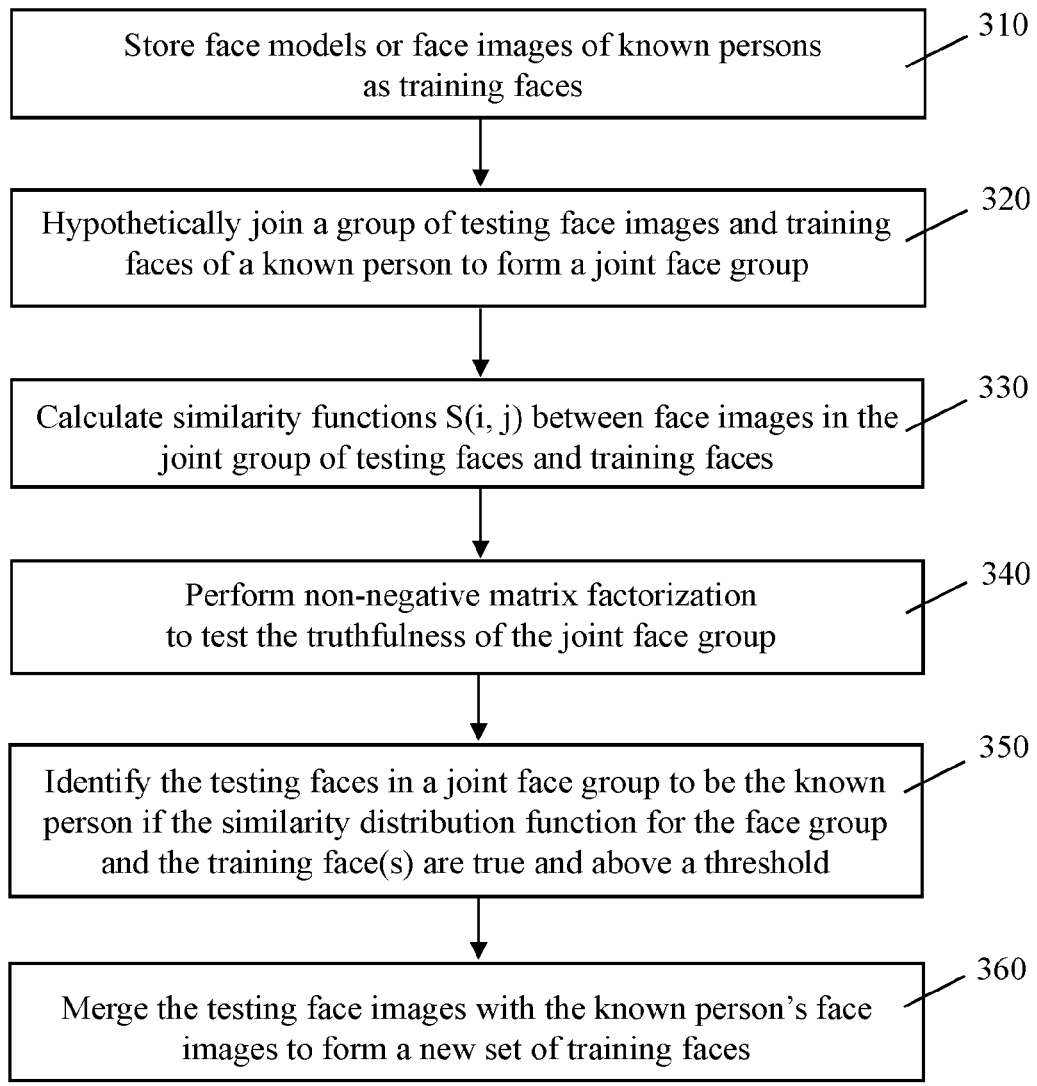
FIG. 3 is a flow diagram for identifying face images in accordance with the present invention.

In some embodiments, referring to FIG. 3, face recognition can include one or more of the following steps. Face models or face images of known persons are stored (step 310) as training faces. Examples of the know persons can include a family members and friends of a user the uploaded or stored the images from which the face images are extracted. The face images to be identified in the face groups are called testing faces.

A group of testing faces is then hypothetically joined with a training faces of a known person to form a joint group (step 320). The group of testing faces can be already tested to be true as described in step 270 (in FIG. 2).

Similarity functions S(i,j) are calculated between each pair of testing or training face images in the joint face group (step 330). The collection of the similarity functions S(i,j) in the joint face group are described in a similarity distribution function P(S(i,j)).

Similar to the previous discussions relating to steps 260-270, non-negative matrix factorization is be performed on the similarity function values to estimate $P_{true}(S)$ and $P_{false}(S)$ of the pairs of training and testing face images in the joint face group (step 340). The similarity distribution function P(S(i j)) is compared to $P_{true}(S)$ and $P_{false}(S)$ and the precision (similarity to $P_{true}$) is tested versus a predetermined threshold (step 340).

The testing faces in the joint face group are identified to be a known person if the similarity distribution function P(S(i,j)) is True at a percentage higher than a threshold (step 350), that is, when the precision is above a threshold.

The group of testing face images can be merged with the known person's face images (step 360), thus producing a new set of training faces for the known person.

It should be noted that the above disclosed method differs from the conventional method of measuring distance between face models and candidate face images. In the disclosed method, similarity functions among both the training faces (i.e. known persons' faces) and the testing face images (unknown faces) are calculated. The training faces and the testing face images are grouped using such similarity functions to form a hypothetical joint face group. Each joint face group includes both the testing face images and the training face. The similarity distributions $P_{true}(S)$ and $P_{false}(S)$ obtained in non-negative matrix factorization of similarity functions in the joint face group describe both train and test faces. As a result, for every group pair of face groups (including groups of single faces), the probability can be estimated if these two groups should be merged into a bigger true group. Groups with high probability to merge with a person model are recognized as belonging to the person. Similar technique was described for advance grouping algorithm.

It should be understood that the presently disclosed systems and methods can be compatible with different devices or applications other than the examples described above. For example, the disclosed method is suitable for desktop, tablet computers, mobile phones and other types of network connectable computer devices.

What is claimed is:

1. A computer-implemented method for recognizing face images, comprising:
    storing face models or face images of a known person as training faces in a computer storage;
    joining a group of testing face images of one or more unknown individuals with a group of training faces that belong to the known person to form a joint face group;
    calculating similarity functions, by a computer processor, between pairs of testing face images and training faces in the joint face group;
    conducting non-negative matrix factorization on values of the similarity functions in the joint face group to test truthfulness of the joint face group; and
    identifying the testing face images to belong to the known person if a percentage of the associated similarity functions being true in the joint face group is above a threshold based on the non-negative matrix factorization.

2. The computer-implemented method of claim 1, further comprising:
    merging the testing face images with the training faces of the known person to form a new set of training faces for the known person.

3. The computer-implemented method of claim 1, wherein the step of conducting non-negative matrix factorization comprises:
    forming a non-negative matrix using values of similarity functions between all different pairs of testing face images and training faces in the joint face group,
    wherein the non-negative matrix factorization is conducted over the non-negative matrix.

4. The computer-implemented method of claim 1, wherein the similarity functions in the joint face group are described in a similarity distribution function, wherein the step of conducting non-negative matrix factorization outputs a True similarity distribution function and a False similarity distribution function.

5. The computer-implemented method of claim 4, wherein the step of identifying the testing face images to belong to the known person comprises:
    comparing the similarity distribution function to the True similarity distribution function and the False similarity distribution function.

6. The computer-implemented method of claim 1, further comprising:
    detecting testing faces in images; and
    cropping portions of the images to produce the testing face images comprising the testing faces of the one or more unknown individuals.

* * * * *